Dec. 4, 1962　　　A. C. BROCKMAN　　　3,066,955
SEMI-TRAILER CONSTRUCTION
Filed Oct. 6, 1960　　　5 Sheets-Sheet 1
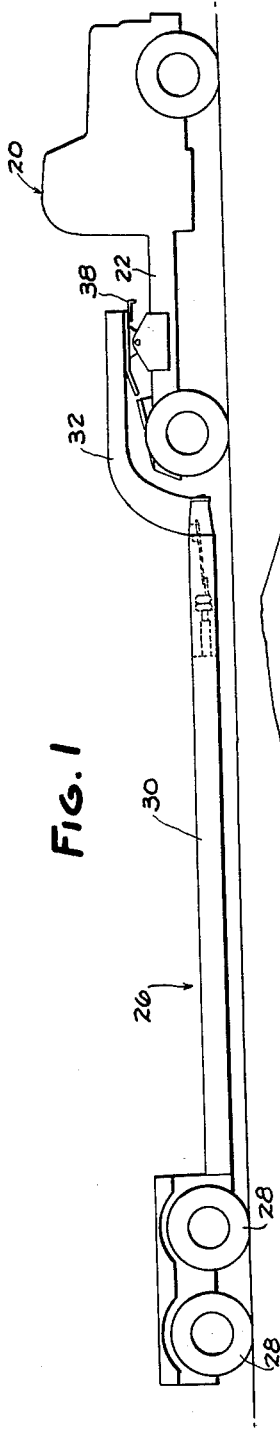
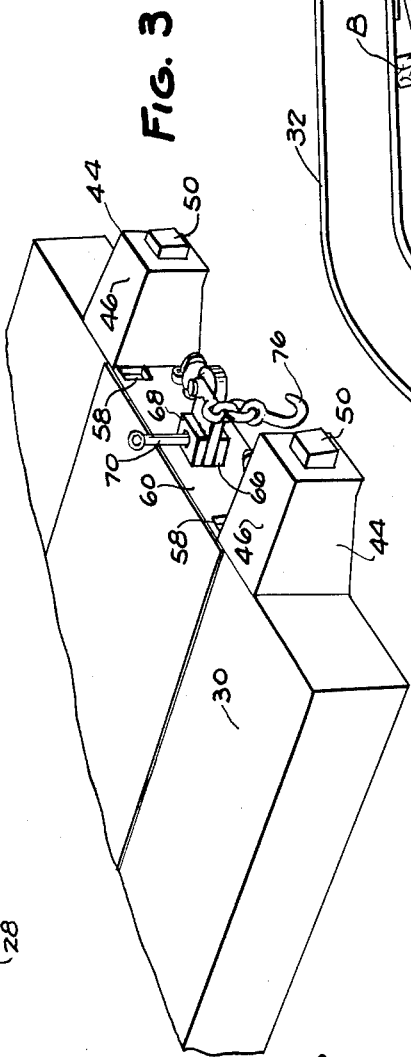
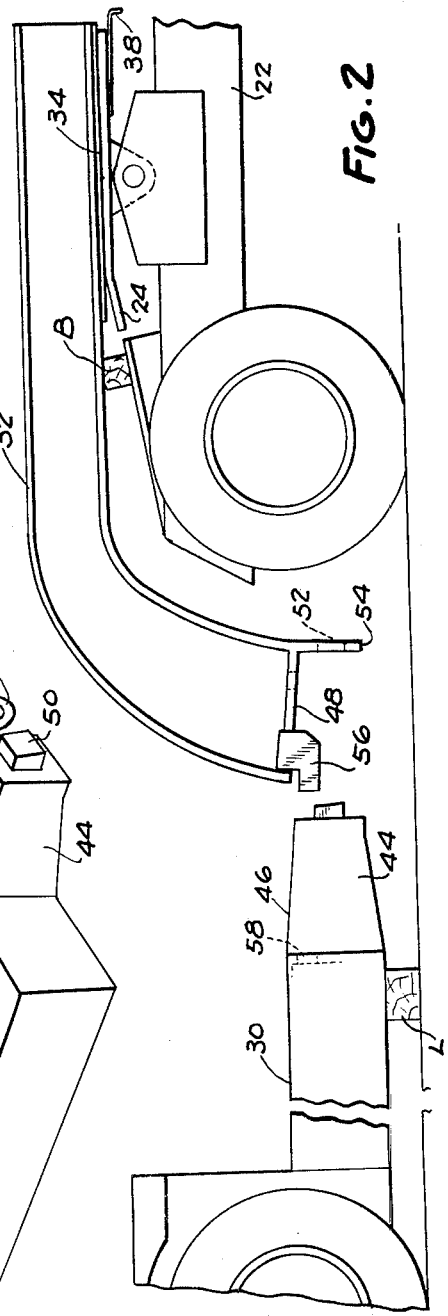
INVENTOR.
ARTHUR C. BROCKMAN
BY
Barnes, Kisselle, Raisch & Choate
ATTORNEYS

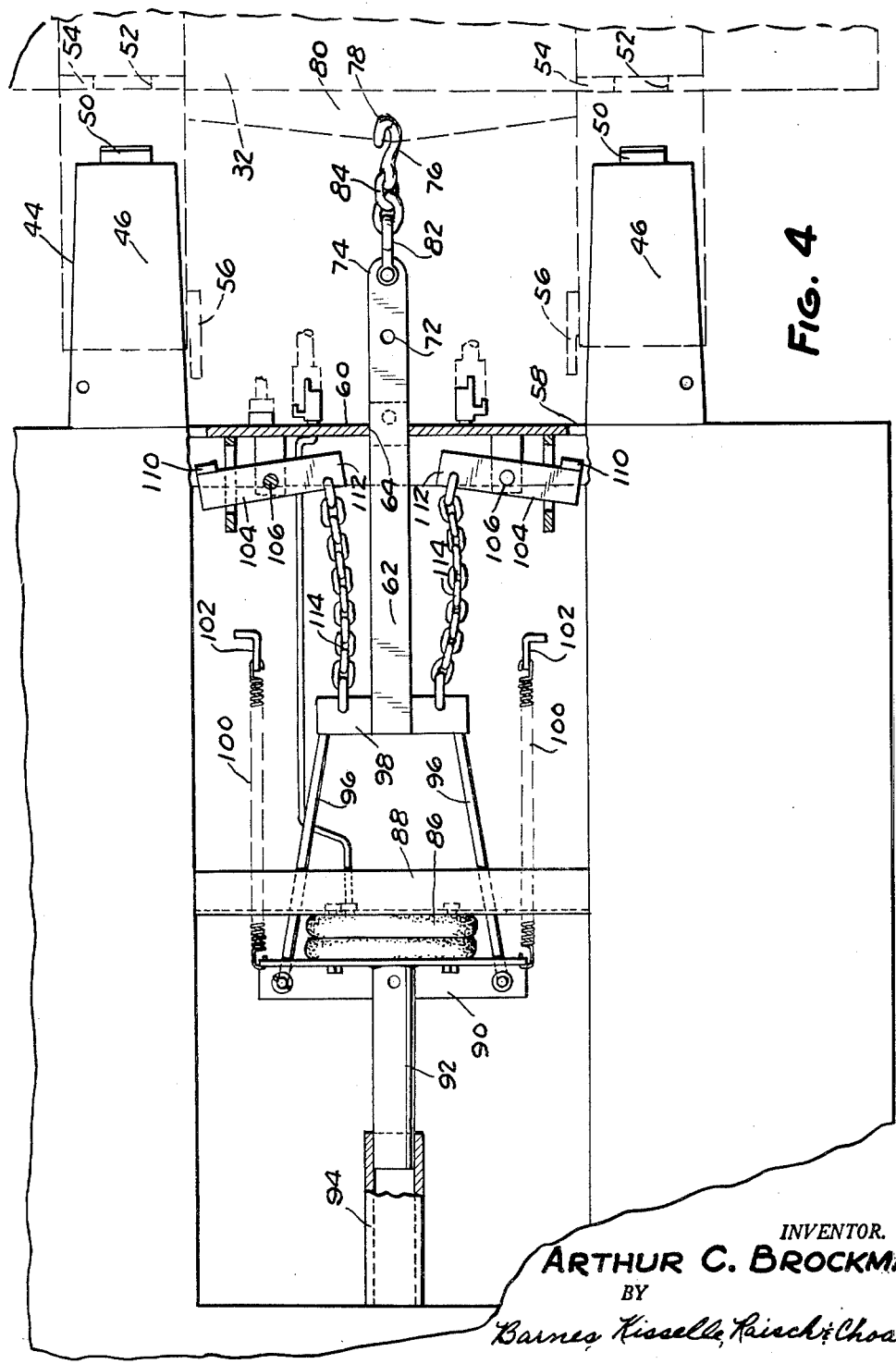

Dec. 4, 1962 A. C. BROCKMAN 3,066,955
SEMI-TRAILER CONSTRUCTION
Filed Oct. 6, 1960 5 Sheets-Sheet 3
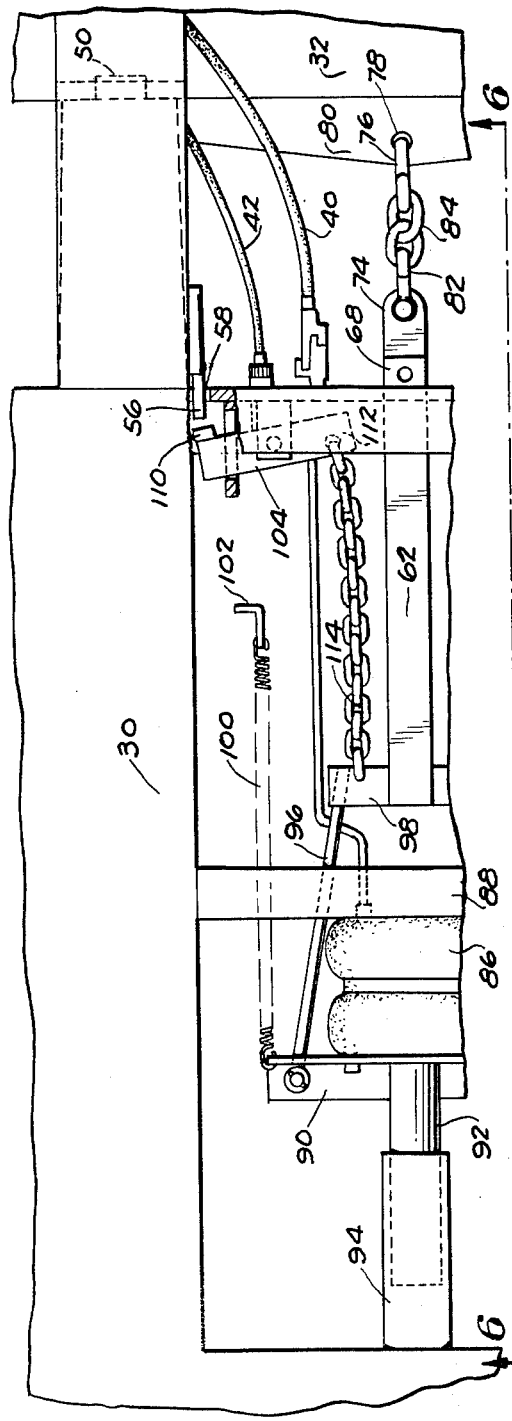
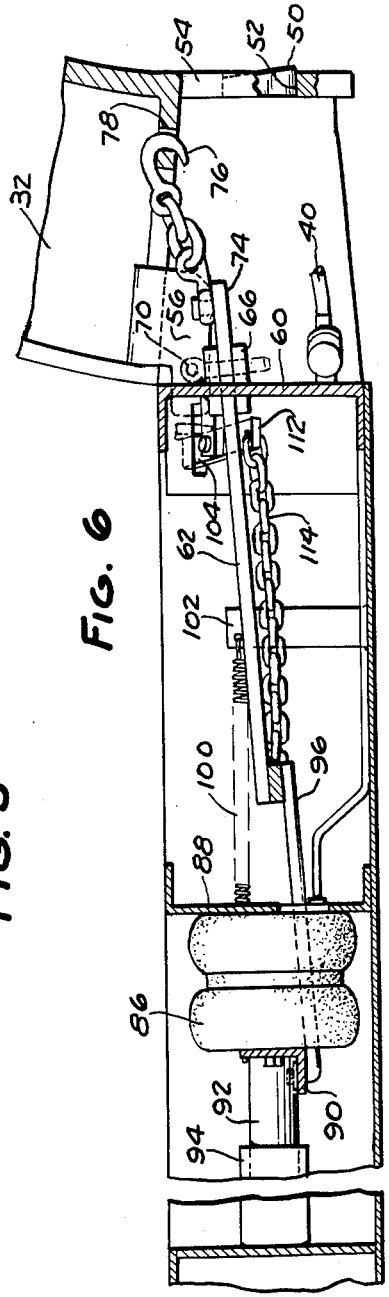
INVENTOR.
ARTHUR C. BROCKMAN
BY
Barnes, Kisselle, Raisch & Choate
ATTORNEYS Dec. 4, 1962 A. C. BROCKMAN 3,066,955
SEMI-TRAILER CONSTRUCTION
Filed Oct. 6, 1960 5 Sheets-Sheet 4

INVENTOR.
ARTHUR C. BROCKMAN
BY
Barnes, Kisselle, Raisch & Choate
ATTORNEYS

Dec. 4, 1962 A. C. BROCKMAN 3,066,955
SEMI-TRAILER CONSTRUCTION
Filed Oct. 6, 1960 5 Sheets-Sheet 5

INVENTOR.
ARTHUR C. BROCKMAN
BY
Barnes, Kisselle, Raisch & Choate
ATTORNEYS

United States Patent Office 3,066,955
Patented Dec. 4, 1962

3,066,955
SEMI-TRAILER CONSTRUCTION
Arthur C. Brockman, 10101 Ford Road,
Birmingham, Mich.
Filed Oct. 6, 1960, Ser. No. 61,036
3 Claims. (Cl. 280—423)

This invention relates to a tractor and semi-trailer combination and is particularly concerned with a semi-trailer of the type having a low bed and a gooseneck type drawbar for transmitting load from the trailer bed to the fifth wheel of a tractor, the gooseneck being detachable from the trailer bed to facilitate front end loading and unloading of the trailer. Semi-trailer combinations of this type are frequently used for hauling unusually heavy loads such as heavy industrial machinery, earth-moving machinery and the like.

The gooseneck is necessarily of strong heavy construction and attaching and detaching the gooseneck from the trailer bed presents handling problems. A conventional way of meeting this problem is to mount a winch on the tractor forwardly of the fifth wheel member. The gooseneck is raised, lowered and supported during its manipulation by means of a cable wound on the winch. Because of the relatively great weight of the gooseneck and the distance which it projects beyond the supporting part of the tractor, the winch equipment and its power take-off from the tractor transmission must be relatively large, strong and expensive. The cost of mounting a suitable winch on a tractor and adding a power take-off is of the order of about $1,000.00. The addition of a winch to the tractor makes it a special purpose vehicle and reduces its overall usefulness.

Another disadvantage of the winch and cable handling mechanism for a gooseneck is that the steps involved in removing the gooseneck from its trailer bed and reconnecting the gooseneck to the trailer are complex and time consuming. Moreover, if through inexperience or carelessness, the operator fails to follow the proper sequence of steps, cable breakage and damage to the winch mechanism frequently occur. Failure to follow and properly execute the sequence of steps also frequently results in dropping the gooseneck on the ground which necessarily involves a waste of time and effort in either jacking the gooseneck up or in calling in a crane of adequate capacity to lift the gooseneck for further handling.

Numerous attempts have been made heretofore to provide structures eliminating the necessity for the winch and utilizing solely the mobility and power of the tractor itself for handling the gooseneck. Successful structures for accomplishing this are disclosed in my Patent No. 2,871,027 dated January 27, 1959 and my copending applications Serial No. 709,772, filed August 21, 1957 and Serial No. 757,960, filed August 29, 1958, now Patent No. 2,952,476.

An object of the present invention is to provide a further simplified improved inexpensive semi-trailer structure facilitating more rapid and convenient manipulation of the gooseneck to and from connected relation to a low bed trailer.

The invention is carried out generally by providing fixed lugs on the trailer bed engageable within fixed stirrups on the gooseneck to form a load-transmitting connection. A coupling mechanism and an uncoupling mechanism are mounted on the trailer bed and are operated respectively under the influence of a single expansible air bag to shift the bed and gooseneck toward and away from each other for connecting and disconnecting the lugs and stirrups. The gooseneck and trailer bed have other parts which co-operate to assist in maneuvering the gooseneck during the coupling and uncoupling procedures. One form of the invention is shown in the accompanying drawings.

FIG. 1 is a partly diagrammatic elevational view of a tractor and low-bed semi-trailer utilizing the present invention.

FIG. 2 is an enlarged fragmentary partly diagrammatic elevational view illustrating the gooseneck and trailer bed in uncoupled relation.

FIG. 3 is a fragmentary perspective view showing the front end of the trailer bed.

FIG. 4 is a fragmentary generally plan view of the trailer bed with a cover plate removed, parts being broken away and shown in phantom to illustrate structure.

FIG. 5 is a fragmentary generally plan view of the front end of the trailer with a cover plate removed, illustrating the trailer bed and gooseneck in coupled relation.

FIG. 6 is a generally sectional view on line 6—6 of FIG. 5.

Figure 10:
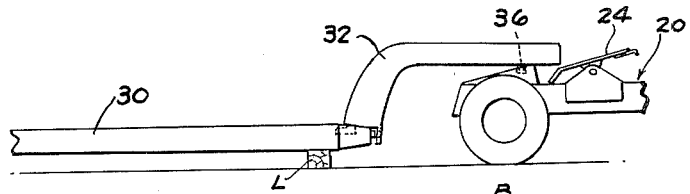
FIGS. 10–14 are fragmentary partly diagrammatic elevational views illustrating various steps in the uncoupling and coupling procedures.

Shown in the drawings is a tractor 20 having a frame 22 on which is mounted a conventional fifth wheel element 24. A low-bed type semi-trailer 26 having rear ground engaging wheels 28 and a bed 30 is coupled with tractor 20 through a gooseneck type draw bar 32 having adjacent its forward end portion a conventional fifth wheel plate 34 with a depending king-pin 36 (FIG. 10) releasably engaged with latching mechanism (not shown) on fifth wheel element 24. The fifth wheel latch is provided with a release lever 38. Air lines 40 provide air under pressure to the air brake system of the semi-trailer and electric conduits 42 furnish electric current to the semi-trailer.

Trailer bed 30 has a pair of spaced-apart forwardly projecting supports 44 which may comprise extensions of longitudinal beam members (not shown) of the trailer bed. Each support has an upwardly disposed slightly inclined surface 46 providing a seat for engagement by downwardly disposed slightly inclined surfaces 48 at the rear base portion of gooseneck 32. Each support 44 also has a forwardly projecting fixed lug 50 engageable within a complementary opening 52 in one of a pair of spaced-apart stirrups 54 fixedly depending below base surfaces 48 of the gooseneck. The gooseneck has a pair of depending and rearwardly extending L-shaped plates 56 spaced apart for insertion into a pair of openings 58 in the front plate 60 of the trailer bed.

Mechanism for coupling the gooseneck to the trailer bed includes a drawbar 62 slidable longitudinally of the trailer through an opening 64 in front plate 60 and between guides 66, 68 which are apertured to receive a drop pin 70. Draw bar 62 also has an aperture 72 for receiving drop pin 70 and the drawbar has adjacent its forward end portion 74 means for detachable connection to gooseneck 32. This means conveniently comprises a hook 76 insertable through an eye 78 in a cross member 80 of the gooseneck, the hook being secured to the drawbar through a pivoted eye 82 and interposed chain links 84.

A flexible pneumatically expansible air bag 86 is anchored on a cross member 88 of the trailer bed. A cross head 90 is secured to the air bag and is forced rearwardly when the air bag is expanded. The cross head is guided for longitudinal movement by a rod 92 slidably engaged within a longitudinal tube 94 secured on the trailer bed. Cross head 90 is operably connected to drawbar 62 by a yoke which includes rods 96 anchored to the cross head and to a cross bar 98 on the drawbar. A pair of springs 100 are tensioned between cross head 90 and anchors 102 on the trailer bed for collapsing air bag 86 when air pressure therein is relieved.

Mechanism for uncoupling the trailer bed and gooseneck includes a pair of levers 104 pivotally mounted on the trailer bed as at 106, each lever having an outer end with a shoe 110 which can be swung forwardly for forcibly engaging one of the L-shaped plates 56 on the gooseneck which projects through an opening 58 in coupled relation of the trailer bed and gooseneck. The inner end 112 of each lever is operably connected to air bag 86 by a chain 114 secured between lever end 112 and yoke member 98 or by other suitable linkage which will remain slack when the air bag is expanded to the FIG. 5 position in which the trailer bed and gooseneck are connected.

In use it may be assumed that tractor 20, gooseneck 32 and trailer bed 30 are in the coupled relation illustrated in FIG. 1. The forward end of gooseneck 32 is supported by fifth wheel 24 on the tractor and at the rearward end of the gooseneck lugs 50 are engaged within stirrup openings 52 and base portions 48 of the gooseneck are seated against supporting surfaces 46 on forward projections 44 of the trailer bed. Interengagement of lugs 50 with openings 52 and surfaces 48 with surfaces 46 provides the load-transmitting connection between the gooseneck and trailer bed.

The various parts of the coupling and uncoupling mechanisms are in the positions shown in FIGS. 5 and 6. Drawbar 62 is retracted so that its opening 72 is aligned with the openings in guides 66 and 68 and drop pin 70 is inserted through the aligned openings. Hook 76 is engaged through opening 78 in gooseneck member 80. L-shaped plates 56 on the gooseneck project through openings 58 in the front of the trailer bed. Chains 114 are slack so that there is no force on levers 104 which would urge shoes 110 against plates 56. Bag 86 is held in the distended condition shown by drawbar 62 through yoke members 96 and 98 against the tension of springs 100. The air and electrical lines 40 and 42 are coupled as illustrated.

In this position of the parts, for all practical purposes, the draft connection between the gooseneck and trailer is provided by frictional interengagement of lugs 50 in openings 52 and gooseneck surfaces 48 against trailer bed surfaces 46. The additional connection provided by drop pin 70, drawbar 62 and the chain and hook are merely for safety purposes.

To uncouple the gooseneck from the trailer bed, the operator first places a log L under the forward end of the trailer bed, disconnects lines 40 and 42, disconnects hook 76 from the gooseneck and withdraws drop pin 70. This frees drawbar 62, yoke members 96 and 98 and cross head 90 for further rearward movement. However, momentarily air bag 86 will be collapsed forwardly by springs 100, carrying the yoke mechanism and drawbar forward with it.

The operator now actuates valving for introducing air under pressure into bag 86 which expands rearwardly to force cross head 90, yoke elements 96, 98 chains 114 and the inner ends 112 of levers 104 rearwardly. This swings the outer ends of the levers forwardly so that their shoes 110 are engaged forcibly against the inner ends of L-shaped plates 56 which project through front openings 58 in the trailer bed. Even though the force exerted by the levers on plates 56 is considerable, it is insufficient to shift gooseneck 32 forwardly relative to the trailer bed because of the great load-induced friction between the surfaces 46 and 48 and lugs 50 and stirrup openings 52. Consequently, nothing happens at this moment.

Figure 7:
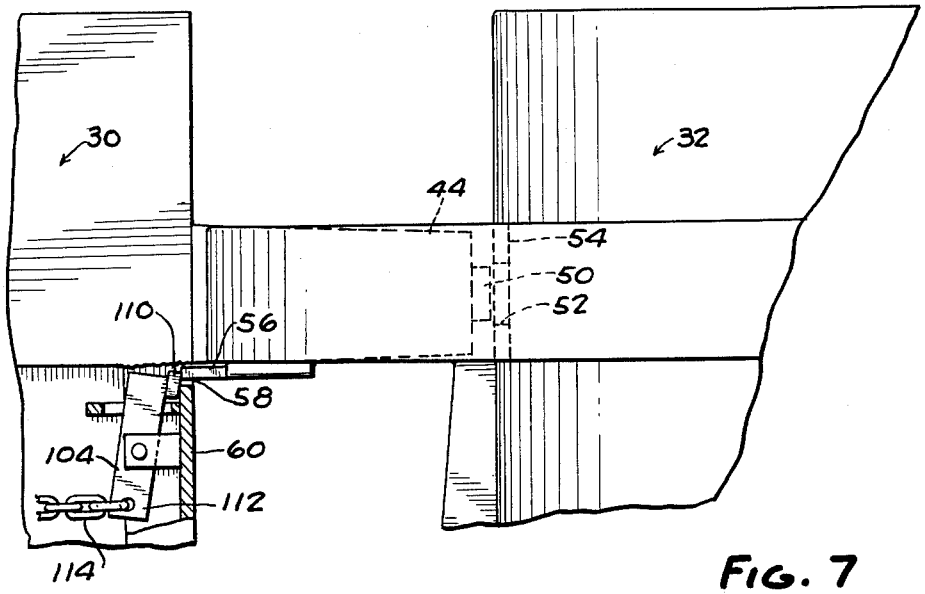
FIG. 7 is a fragmentary elevational view of the trailer bed and gooseneck illustrating a step in the uncoupling procedure.
Figure 8:
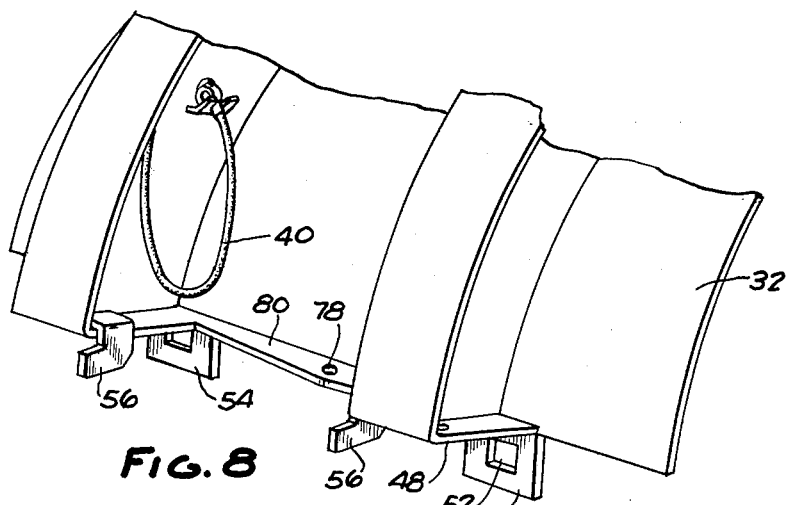
FIG. 8 is a fragmentary perspective view of the rear end of the gooseneck.
Figure 9:
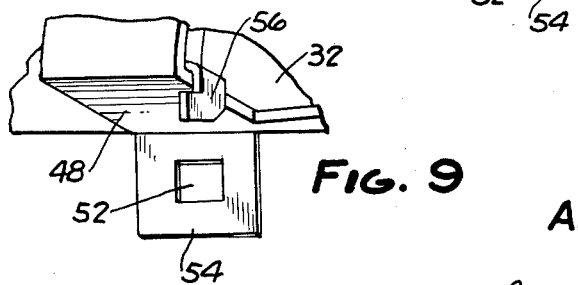
FIG. 9 is a fragmentary perspective view of the underside of the gooseneck and showing surfaces which contact forward portions of the trailer bed.

Next, the operator uncouples fifth wheel 24, 34 by operating lever 38 and then drives tractor 20 forwardly. The forward end of the gooseneck rides down the ramp to the rear of the fifth wheel to rest the forward end of the bed on log L and this relieves vertical load in the connection between the gooseneck and trailer bed to relieve the friction therein. When the friction is relieved, the force exerted by levers 104 on plates 56 shifts the gooseneck forwardly to the position illustrated in FIGS. 7 and 10, in which stirrup openings 52 have disengaged lugs 50. Forward swinging movement of shoes 110 is arrested by their engagement with front plate 60 on the trailer bed so that plates 56 on the gooseneck are not forced completely out of openings 58 but to the contrary remain engaged within openings 58. The reason for this is that if in driving the tractor forwardly the operator should inadvertently go too far, the forward end of the gooseneck will merely rock down a certain distance and the rearward ends of plates 56 will rock upwardly into engagement with the tops of openings 58 so that the gooseneck will be supported in generally erect condition on the bed member rather than being dropped to the ground.

Figure 11:
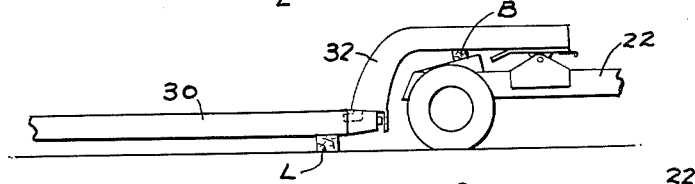
Figure 12:
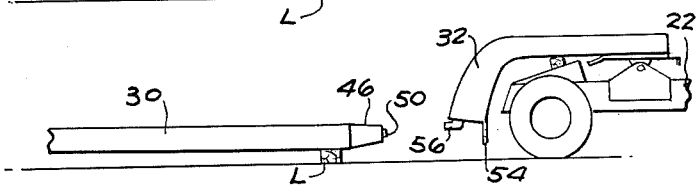

The operator now backs the tractor to the FIG. 11 position for re-coupling the fifth-wheel elements and places a log or block B between the gooseneck and the underlying portions of the tractor frame. During this backing movement, the gooseneck is prevented from shifting rearwardly by engagement of shoes 110 against plates 56 thereby preventing the load-transmitting connection from re-coupling. The tractor can now be driven forwardly as indicated in FIG. 12 to remove the gooseneck from the trailer bed.

Figure 13:
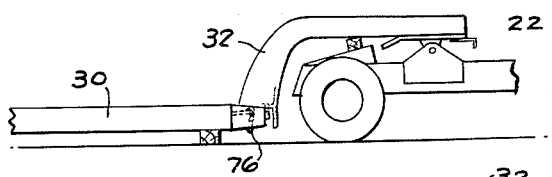

To recouple the gooseneck and trailer bed, the operator actuates suitable valving for relieving air pressure in bag 86 and tensioned springs 100 through cross head 90 collapse the bag and carry yoke 96, 98 and drawbar 62 forwardly. This relieves the tension in chains 114 and enables lever shoes 110 to be swung backwardly away from openings 58. With the gooseneck supported on the tractor in the manner shown in FIG. 12, the operator now backs the tractor so that plates 56 pass between extensions 44. The plates may or may not be vertically aligned with openings 58 and stirrup openings 52 may or may not be vertically aligned with lugs 50. The misalignment may result from load on the trailer bed or uneven ground under the tractor or trailer bed or the like. The driver backs the tractor until either plates 56 engage forward plate 60 on the trailer bed or until stirrups 54 engage lugs 50 (FIG. 13).

Figure 14:
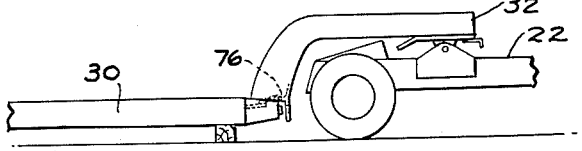

The operator now inserts hook 76 through gooseneck opening 78 (FIG. 14) and operates valving to introduce air under pressure into bag 86. The bag expands and exerts rearward force on cross head 90 tending to draw drawbar 62 and the gooseneck rearwardly. If, as frequently happens, there is only slight misalignment between lugs 50 and stirrup openings 52, the force of air bag 86 will at this time pull the gooseneck rearwardly to engage the lugs within the stirrup openings. The gooseneck and trailer bed are now again in coupled relation and drop pin 70 can be inserted through the aligned openings in guides 66 and 68 and drawbar opening 72. During road operation of the semi-trailer, the air pressure in bag 86 may or may not be relieved at the option of the operator.

If during the re-coupling procedure there is considerable vertical misalignment of plates 56 and openings 58 or lugs 50 and stirrup openings 52, the air bag 86 will not pull the gooseneck to coupled relation when air is introduced into it. In this situation the operator uncouples the fifth wheel elements and drives the tractor forwardly thereby permitting gooseneck base surfaces 48 to settle into engagement with supporting surfaces 46 thereby aligning plates 56 with holes 58 and stirrup openings 52 with lugs 50. When this happens, the force of the air bags shifts the gooseneck rearwardly to its coupled position. The operator then backs the tractor to re-couple the fifth wheel elements. The drop pin is inserted and the semi-trailer is in condition for road operation.

The air bag, springs 100, chains 114 and the various yoke and lever elements amount to about $30.00 worth of materials. The elements can be mounted on the trailer bed with about six man hours labor. Thus, the entire coupling and uncoupling mechanisms are very inexpensive.

I claim:

1. In a semi-trailer having a bed member and a detachable gooseneck member for transmitting load to a tractor, the improvement which comprises, means forming a detachable load-transmitting connection between said members, a coupling device mounted on said bed member and including an element movable longitudinally of said trailer and having means detachably connected to said gooseneck member, a pneumatically expansible air bag on said bed member providing a motor operably connected to said element so that when said air bag is expanded, said element draws said gooseneck member toward said bed member for connecting said connection, and an uncoupling device on said bed member which includes an element forwardly movable on said bed member for engagement with a part of said gooseneck member, means operably interconnecting said air bag and said forwardly movable member, so that when said air bag is expanded it provides motor means actuating said forwardly movable element, said forwardly movable element being operative under the influence of said motor means to shift said gooseneck member away from the forward end of said bed member for disconnecting said load bearing connection.

2. In a semi-trailer having a bed member and a detachable gooseneck member for transmitting load to a tractor, the improvement which comprises, means forming a detachable load-transmitting connection between said members, a coupling device on said bed member including an element which is rearwardly retractable longitudinally of the trailer, means providing a detachable connection between said element and said gooseneck member, an air bag on said bed member pneumatically expansible in a rearward direction, means operably interconnecting said element and air bag so that when said air bag expands said element draws said gooseneck member toward said bed member to connect said connection, an uncoupling device on said bed member which includes an element forwardly movable into engagement with a part of said gooseneck member, means operably interconnecting said air bag and said forwardly movable element, the latter said operable connection including means which is in slack condition when said air bag has been expanded to a condition in which said load-bearing connection is connected by said coupling device, said air bag being operable upon further rearward expansion thereof to take up the slack in said operable connection and actuate said forwardly movable element for shifting said gooseneck member away from said bed member and disconnecting said load-bearing connection.

3. In a semi-trailer having a bed member and a detachable gooseneck member for transmitting load to a tractor, the improvement which comprises, means forming a detachable load-transmitting connecting between said members, a coupling device on said bed member including a longitudinaly movable bar having means detachably connected to said gooseneck member, an air bag on said bed member pneumatically expansible in a rearward direction, a yoke operably interconnecting said air bag and bar so that upon expansion of said air bag said bar is pulled rearwardly to draw said gooseneck member toward said bed member and thereby connect said connection, an uncoupling device on said bed member including lever means having a portion swingable forwardly into engagement with a part of said gooseneck member and means operably interconnecting said air bag and lever means, the latter said operably interconnecting means including flexible means which is slack when said air bag is extended to a condition wherein said coupling device has coupled said connection, said air bag being operable upon further rearward extension to take up the slack in said flexible means and operate said lever means so that said forwardly swingable portion thereof shifts said gooseneck member away from said bed member for disconnecting said connection.

References Cited in the file of this patent

UNITED STATES PATENTS

| 2,944,834 | Hill | July 12, 1960 |
| 2,947,547 | Gouirand | Aug. 2, 1960 |
| 2,978,128 | Polich | Apr. 4, 1961 |